United States Patent [19]
Schwärzler

[11] 3,895,585
[45] July 22, 1975

[54] TWO-SIDED LINEAR INDUCTION MOTOR ESPECIALLY FOR SUSPENDED VEHICLES

[75] Inventor: Peter Schwärzler, Furstenfeldbruck, Germany

[73] Assignee: Krauss-Maffei Aktiengesellschaft, Munich, Germany

[22] Filed: Dec. 17, 1973

[21] Appl. No.: 425,616

[30] Foreign Application Priority Data
Dec. 30, 1972 Germany.............................. 2264320

[52] U.S. Cl...... 104/148 LM; 104/148 MS; 310/12; 318/135
[51] Int. Cl.² ......................................... B61B 13/08
[58] Field of Search. 104/148 LM, 148 MS, 148 SS; 310/12, 13; 318/135

[56] References Cited
UNITED STATES PATENTS 3,780,668  12/1973  Schwärzler................... 104/148 MS
3,802,349  4/1974   Guimbal ...................... 104/148 LM

*Primary Examiner*—M. Henson Wood, Jr.
*Assistant Examiner*—Reinhard J. Eisenzopf
*Attorney, Agent, or Firm*—Karl F. Ross; Herbert Dubno

[57] ABSTRACT

A two-sided linear induction motor, especially for a magnetically suspended vehicle, has a stator provided with coils which generate a traveling magnetic field inducing movement of the vehicle along a track. The track is provided with a pair of reaction rails having layers of conductive material confronting the active portions of the stator core and, in accordance with the principles of the present disclosure, form the shanks of a U-cross section rail of ferromagnetic material, e.g. iron, in which the bight of the U forms a magnetic return path for the field generated by the magnet coils generally transverse to the direction of travel of the vehicle.

7 Claims, 4 Drawing Figures

TWO-SIDED LINEAR INDUCTION MOTOR ESPECIALLY FOR SUSPENDED VEHICLES

CROSS-REFERENCE TO RELATED APPLICATION

The present application is related to application Ser. No. 324,150 filed Jan. 16, 1973 and entitled TWO-SIDED LINEAR INDUCTION MOTOR ESPECIALLY FOR SUSPENDED VEHICLES now U.S. Pat. No. 3,820,472 issued June 28, 1974.

FIELD OF THE INVENTION

The present invention relates to a two-sided (double-sided) linear induction motor for vehicle applications and, more particularly, to improvements in the system described and claimed in the aforementioned copending application.

BACKGROUND OF THE INVENTION

As pointed out in the aforementioned application, which is related to the commonly assigned copending applications Ser. No. 268,132 filed June 30, 1972 (U.S. Pat. No. 3,804,022), Ser. No. 268,133 filed June 30 1972 (U.S. Pat. No. 3,797,403), Ser. No. 280,073 filed August 11, 1972 (U.S. Pat. No. 3,780,668), Ser. No. 280,074 filed Aug. 11, 1972 (U.S. Pat. No. 3,842,748) and Ser. No. 292,638 filed Sept. 27, 1972 (U.S. Pat. No. 3,804,997), linear induction motors have been used heretofore for vehicle propulsion in systems for the transport of passengers and freight within urban areas, between urban areas and in or through rural areas, replacing wheel-driving rotary motors for these purposes.

A linear induction motor generally comprises a coil structure or winding assembly carried by the vehicle and juxtaposed with a rail of ferromagnetic material mounted upon and fastened to a track so that a magnetic path is closed through the rail and, with appropriate energization of the winding, develops magnetic force components in the direction of vehicle propulsion. Linear induction motors operating on these principles have been described for example in U.S. Pat. Nos. 2,412,511 and 2,519.253.

Such propulsion systems have been found to be of increasing interest in recent years because they eliminate the need for rotors, bearings for rotatably journaling such rotors and the wheel assemblies thereof, and mechanical drive trains between the rotor and the propelling means. Furthermore, they eliminate the need for frictional interengagement of the vehicle and a track as is required when the rotor must drive a wheel or a gear to effect displacement of the vehicle.

In a conventional double-sided linear induction motor, there are provided two coils (or sets of coils) or winding assemblies, hereinafter referred to as stator windings between which a rail of ferromagnetic material is disposed. In other words, the stator windings flank the rail.

A disadvantage of this arrangement resides in the fact that substantially all of the ferromagnetic material (iron) of the motor in practice must be carried by the vehicle. While this does not amount to a significant difficulty when the vehicle is supported on wheels or the like, any increase in the weight of a magnetically suspended vehicle requires a compensatory increase in the magnetic field strength of the suspension magnets, thereby requiring either an increase in the supplied electric current or an increase in the number of turns of the electromagnetic winding. The latter further increases the weight of the vehicle and may reduce the load-carrying capacity. The former necessitates an increase in the cost and complexity of the controlled circuitry.

One-sided linear induction motors are, of course, known in which the stator is juxtaposed with a rail of conductive material. However this system provides an unsymmetrical drive to a vehicle carrying the windings and has not proved to be satisfactory in all cases in which magnetic suspensions are provided because two such motor arrangements must be provided upon the vehicle and/or two rails must be disposed along the track to afford the desired symmetry. Also, such one-sided arrangements create unbalanced force components which create unbalanced force components which create problems in lateral guidance and centering of the vehicle on the track.

OBJECTS OF THE INVENTION

It is the principal object of the present invention to provide a two-sided linear induction motor which extends the principles originally set out in application Ser. No. 324,150 and further improves upon the structure and systems there described, especially as applied to magnetically suspended or magneticlevitation vehicles.

It is another object of the invention to provide a double-sided linear induction motor in which the aforementioned disadvantages can be obviated and which is particularly suitable for use in magnetically suspended or magnetic-levitation vehicles or the type described in the other copending applications mentioned previously.

Yet a further object of the invention is to provide a double sided linear induction motor which has a high ratio of efficiency (ratio of electric power input to magnetic-propulsion effect) to support weight.

Still another object of the invention is to provide an improved linear induction motor of simplified constructions.

Yet another object of the invention is to provide a linear induction motor having negligible imbalanced traverse-force components at the movable member thereof.

SUMMARY OF THE INVENTION

These objects and others which will become apparent hereinafter are attained, in accordance with the present invention, wirh a linear induction motor or the double-sided type as described in application Ser. No. 324,150 (U.S. Pat. No. 3,820,472) which comprises a central coil assembly flanked by and magnetically interacting with a pair of reaction-rail portions extending longitudinally along opposite sides of the coil member and composed of ferromagnetic material carrying at least a coating layer of high electrical conductivity and confronting the coil-carrying member.

For the purposes of this disclosure, the term "stator" will be used to describe the coil-carrying member which constitutes, according to the present invention, a longitudinally extending array of coils oriented with axes perpendicular to the aforementioned reactive surfaces and with their turns lying in planes generally parallel to these surfaces, the stack or array of coils being received between a pair of reaction rails of ferromagnetic material. The coils of the stack or packet may be spaced longitudinally apart in the direction in which the rails extend.

It will be appreciated that, in linear induction motors of the present type for use in magnetically suspended vehicles, the stator stack is mounted upon the vehicle which is adapted to travel in a generally horizontal direction, parallel to the longitudinal axes of the stack and, in the system of the prior application Ser. No. 324,150 (U.S. Pat. No. 3,820,472) perpendicular to the planes of the coils which are mirror-symmetrically disposed on opposite sides of a median plane of symmetry.

Hence the term stator, as used here is not intended to apply to a stationary member, but rather to the member which in linear induction motors has heretofore been designated a moving-field coil, an excitation winding, a linear armature or the like. The coils may be excited by using wipers carried by the vehicle and contacting current-carrying rails mounted along the track to produce the moving or traveling field closing through the ferromagnetic masses constituting the reaction rails.

As has also been described in the aforementioned application Ser. No. 324,150 (U.S. Pat. No. 3,820,472) the greater part of the ferromagnetic material with which the coils magnetically cooperate is contained in the reaction rails and is mounted upon the stationary track along which the vehicle travels and thus need not be supported by the magnetic suspension means. Consequently, the weight of the stator carried by the vehicle was relatively low, and, in effect can be considered to be only the weight of the coil assembly. Moreover, the relatively light weight of the coil assembly permits the structure mounting same on the vehicle to be of relatively light weight, low strength and small size.

The increase of the cost of the track was not considered to be significant, especially when the track network was used to operate a larger number of passenger-carrying vehicles which otherwise would require relatively massive motor parts.

As described in the last-mentioned application, moreover, the elongated stator stack or pack was subdivided into a pair of segments perpendicular to the reaction rails with nonmagnetic spacers which define longitudinally spaced laterally open grooves in which the coils were received. This was found to facilitate mounting herewith coils and cooling of the stator assembly in a particularly efficient manner. Furthermore when the ferromagnetic or stator-iron members were constructed as laminates of sheet-iron lamellae, the lamellae were of simple rectangular outline, thereby facilitating manufacture of the stator assemblies and enabling them to be of low cost. The laminated blocks of stator iron could, of course, be separated accurately by the spacers and advantageously project laterally therebeyond in vertical planes transverse to the direction of movement of the vehicle, to form the grooves.

In that system, moreover, it was found to be advantageous to provide at least two pairs of longitudinally spaced grooves on opposite sides of the stator assembly with respective coils (at least two) wound and excited to generate the traveling magnetic field which extends transversely through the stator in one direction and through the stator in the opposite direction at longitudinally spaced locations while closing through longitudinally spaced parts of the reaction rails to effect propulsion of the vehicle.

However, with the arrangement of the system of this application and in other arrangements in which poles of the stator are spaced apart in the direction of movement of the vehicle, the magnetic return path for the flux extending transversely from the stator is through the rail in the longitudinal direction. With this vehicle traveling at speeds of, say 500 Km per hour and using a supply frequency of say 50 Hz, the spacing between such poles or the length of the return path must be about 1.5 meters which is extremely long and is capable of causing considerable magnetic loss unless the iron cross section of the rail is large. Of course, it is possible to reduce the pole spacing, the length of the magnetic return path and the cross section of the rail by increasing the energization frequency, but with powers of several megawatts, considerable apparatus costs and expense for elextronic equipment must be contemplated to bring about the transformation to the higher frequency and, of course, such transformation is accompanied by a disadvantageous power factor of the linear induction motor.

It has been found, in accordance with the present improvement over the system described in the aforementioned copending application Ser. No. 324,150 (U.S. Pat. No. 3,820,472), that these disadvantages can be avoided and significant advantages gained for magnetic suspension vehicle, when the reaction rails flanking the centrally disposed stator are unitarily connected by a ferromagnetic web forming the base of a channel or U-section structure whose shanks constitute the aforementioned rails flanking the stator.

According to the present invention, therefore, the stator core can be disposed wholly between a pair of arms of a ferromagnetic U-section rail whose shanks lie parallel to one another and are transversely spaced to confront opposite active faces of the U-section rail, the winding of the stator being so arranged and connected that the magnetic return path passes through the web interconnecting the shanks whose inner faces may be coated with the conductive layer.

In this concept, therefore, not only do the magnetic flux paths between the active faces of the stator poles and the juxtaposed surfaces of the shanks of the U-section rail lie perpendicular to the rail and the direction of displacement of the vehicle, but even the return path of the magnetic flux through the web lies perpendicular to the rail and the direction of vehicle displacement.

The important advantage of this arrangement is that the U-section rail provides a U-shaped magnetic return path perpendicular to the longitudinal axis of the rail or magnetic flux of the traveling field which is shorter and therefore exposed to less magnetic loss than the return path parallel to the longitudinal dimension of the rail, even with a large spacing between poles and at high motor speed with relatively lower frequency energization.

With the shortening of the return path of the flux there can be a significant reduction in the thickness and cross-section of the rail and, since the "U" provides ample stiffness, the cross-section can be minimized and the inherent stiffness of this profile utilized to minimize mounting expenses for supporting the rail and permitting larger distances between supporting sites.

It has been found to be especially advantageous to utilize the induction motor according to the invention in the drive of electromagnetically suspended and guided (magnetic-levitation) vehicle. In this case the U-section rail acts as a girder for supporting the suspension and guide systems of the vehicles, thereby effecting a saving of material and costs or the track structure thereof. The ferromagnetic rail of the linear induction motor has, as noted, because of its U-profile a high bending moment and can be supported in turn at relatively few points along its length. In addition, the likelihood of mechanical danger to the rail is minimal.

Still another advantage of the system in which the rail serves as a support for the guide and drive systems is that the channel of the U may be laterally open and the armature of the supporting disposed below the rail so that the induction motor and the electromagnetic means of the vehicle may move freely laterally to facilitate transfer of the vehicle between branch tracks and the main track and vice versa. A horizontal mobility in one transverse direction is thereby insured.

The pole surfaces of the electromagnet of the suspension and guide system can be upwardly turned to confront the downwardly extending pole surfaces of an armature rail of U-section formed unitarily with the reaction rail of the motor. The spacing of the pole surfaces of each electromagnet can be equal to the spacing of the pole surfaces of the armature but the electromagnet cores are preferably offset alternately to opposite sides of a median plane through the armature rail as described in the aforementioned applications so that the suspension forces are generated by vertical components of the magnetic flux across the suspension gap while the lateral guidance forces are horizontal components of these fluxes lying alternately in opposite directions. Two such induction motors and suspension-and-guide assemblies may be provided for the vehicle and can be disposed on opposite sides thereof.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 3:
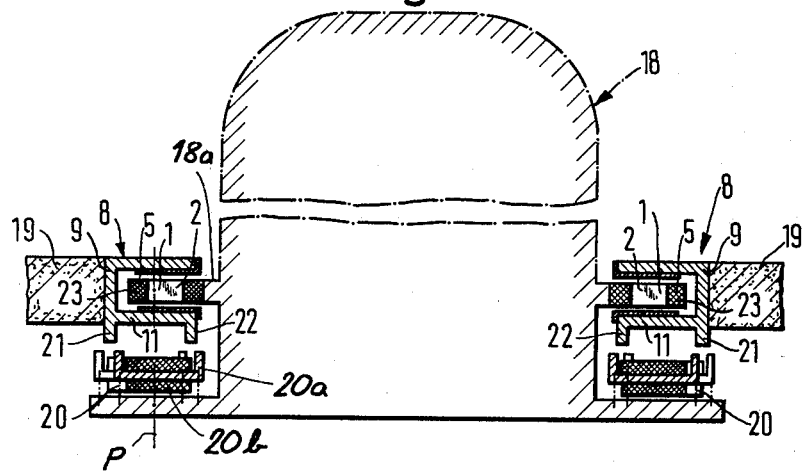
FIG. 3 is a front-elevational view, partly in vertical section through the track structure and partly in diagrammatic form, illustrating a vehicle system according to the invention.
Figure 4:
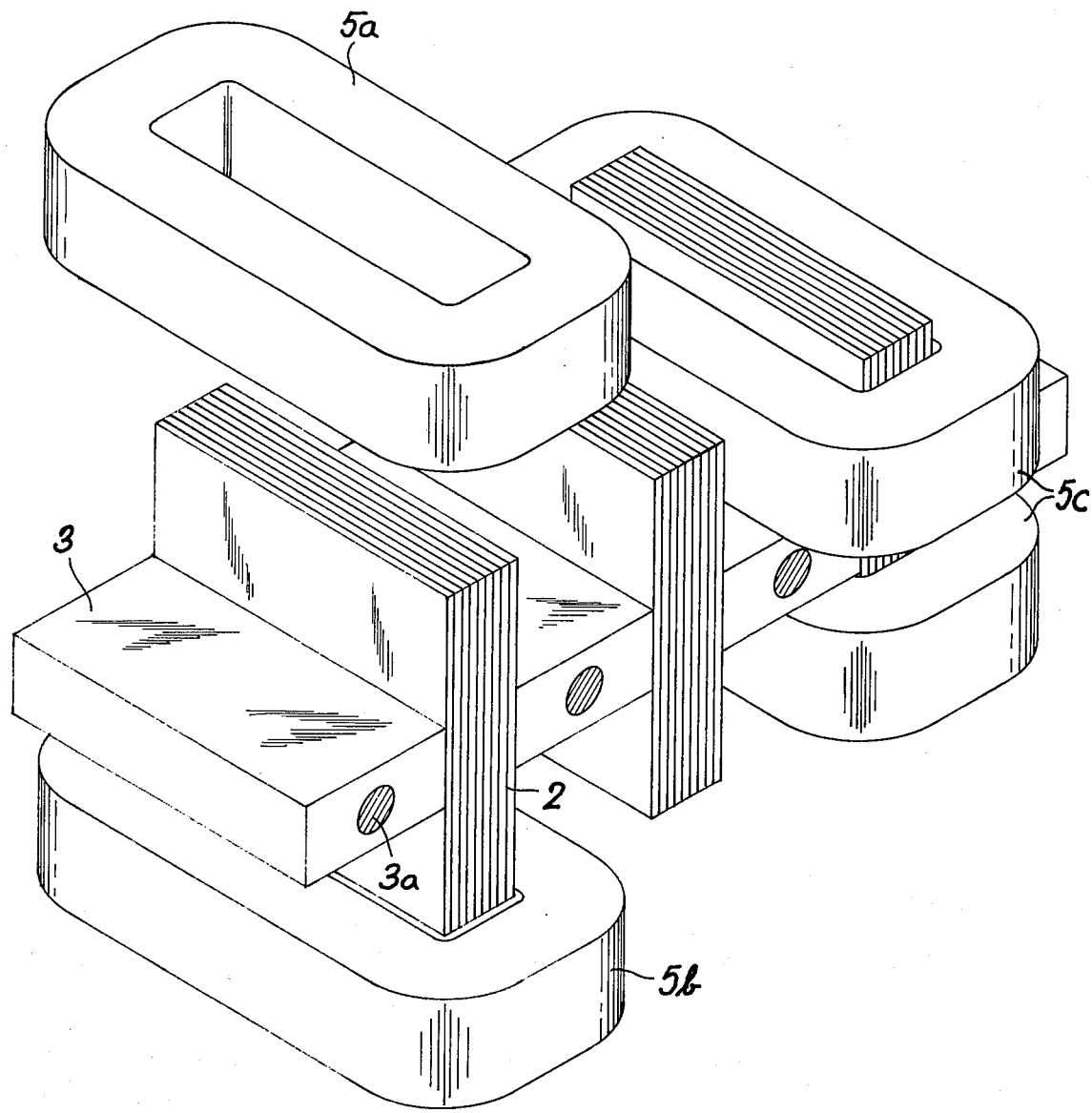
FIG. 4 is an exploded perspective view of a portion of the stator of the linear induction motor showing the relationships of some of the coils thereof to the stator core.

In the drawing, there is shown a linear induction motor which comprises a plurality of sheet-iron stacks or packets 2 of square or rectangular configuration, with the lamellae lying in parallel planes perpendicular to the direction of displacement of the vehicle, i.e. the longitudinal direction. The stator 1 is formed by a plurality of such packets which are spaced apart in the longitudinal direction in a row and are interconnected by non-magnetic spacer members 3 which, as shown in FIG. 4, can be connected by bolts 3a to a respective lateral flange 18a of magnetic suspension vehicle 18 (FIG. 3).

Figure 2:
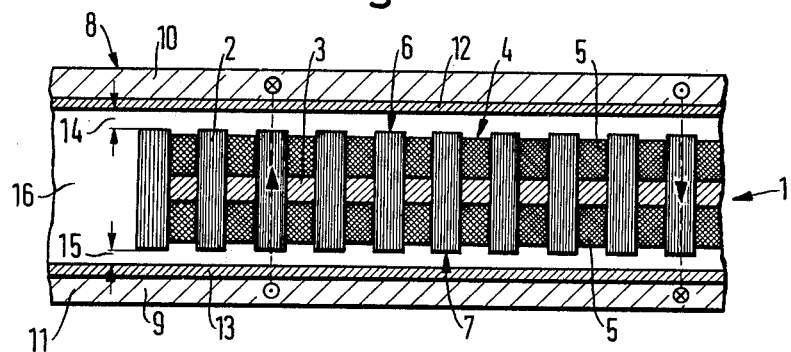
FIG. 2 is a side-elevational view of the linear induction motor with the coils in place.

The spaces 4 between these sheet-iron stacks 2 have the same function as the grooves of the stator assemblies heretofore used, and receive the coils 5a, 5b etc. (FIG. 4) of a three-phase stator winding generally represented at 5 (FIGS. 2 and 3). It will be apparent that the stator 1 has no back structure serving as a magnetic return path and is therefore formed only with the oppositely turned parallel and opposing active outer faces 6 and 7 as described in application Ser. No. 324,150 (U.S. Pat. No. 3,820,472).

The reaction member of the linear induction motor comprises an iron rail 9 of U-profile or cross-section whose shanks 10 and 11 lie in horizontal planes and are provided along their inner surfaces with respective layers of a material of high electrical conductivity, preferably aluminum. The shanks with the conductive rails 12 and 13 thus form reaction rails as described in the last mentioned application which completely flanks the stator 1 so that the latter extends fully into the interior of the reaction rail 9 so that the active outer faces 6 and 7 of the stator define respective air gaps with the confronting reaction rails 12 and 13.

Figure 1:
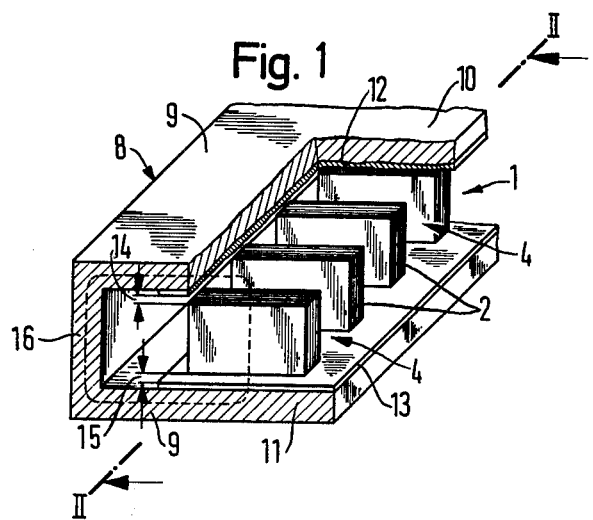
FIG. 1 is a diagrammatic perspective view, partly broken away of a linear induction motor according to the invention, from which the coils have been omitted.

The three-phase winding 5 generates a traveling field such that, for example, the coils 5a and 5b of each sheet-iron packet 2 (FIG. 4) are energized in phase but out of phase with the next pair of coils 5c. As shown in FIG. 1 and by broken lines, the magnetic return path is formed by the bight or web of the rail 9 and extends in a U-shaped pattern between the sheet-iron packets 2. Since these U-shaped return paths, especially for linear induction motors with high speed and about 50 Hz energization frequency, are much shorter than the longitudinal return paths of the system of the above-mentioned application, the iron cross-section and thickness of force will naturally pass from pole to pole along the stator, but the magnetic flux in this direction is substantially less than the longitudinal return flux of the earlier system.

FIG. 3 shows a system in which the linear induction motor is applied to a magnetic-levitation vehicle 18.

At each longitudinal side of the vehicle, there is provided a respective stator 1 which is embraced by a reaction rail 8 consisting of the U-section profiles member 9 fixed to support 19 of the track or right-of-way of the vehicle.

In this case, the U-section iron rails 9 each serve as a suspension and guide armature rail for a respective row of suspension and guide electromagnets 20 carried by laterally projecting ledges of the vehicle. The rails 9, to this end, are provided along their lower shanks with downwardly extending poled flanges 21 and 22 with spacing equal to the spacing between the upwardly turned pole flanges of the U-section cores 20a of the electromagnetic 20. The coils 20b of these electromagnets are represented around the web or bight of the U's. The alternate electromagnets are, as has been described in the aforementioned coupling application, offset to the left and to the right of a vertical median plane P of the armature rail so that the attractive magnetic forces are inclined upwardly and inwardly from each electromagnetic pole to the corresponding pole 21 or 22 of the armature. As a result, the magnetic force has a vertical or suspension component as well as a horizontal component in a direction depending upon the direction of offset. The horizontal components serve to guide the vehicle in accordance with principles fully set forth in the aforementioned copending applications.

The suspension gap, like the motor gap, can be maintained by sensors (not shown) which regulate the current traversing the coils 20b of the electromagnet to maintain the gap substantially constant in spite of variations in loading. When all of the electromagnets offset to the right are energized with greater currents, moreover, the horizontal force to the left can be increased to balance centrifugal force acting in the opposite direction, wind force or any other effect tending to cause lateral deviation of the vehicle from its track.

From FIG. 3 it will be apparent that the heads 23 of the coils of the linear inductionmotor are fully protected by the rails 9 and are prevented from contacting the webs 16 thereof by the horizontal components or guide forces.

I claim:

1. A double-sided linear induction motor, comprising a movable central stator having a core and coil means on said core, said stator having a pair of opposite active faces extending along the direction of displacement thereof; and a stationary reaction member extending in the direction of movement of said stator, said member being composed of ferromagnetic material and being of U-profile with opposite parallel shanks of the U flanking said stator and each spacedly juxtaposed with a respective one of said active faces; said shanks each being provided with a reaction layer of material of high conductivity along its surface confronting the respective active face, said core and said coil means being constructed and arranged to produce a traveling magnetic field along said member for displacing said stator in said direction with a substantial part of the flux return path between magnetic flux entry into and return from said shanks being around the bight of the U, said U-profile member constituting a rail of a magnetic-suspension vehicle track, at least one shank of the U being formed with a pair of projecting flanges defining armature poles cooperating with an electromagnet.

2. The double-sided linear induction motor defined in claim 1 wherein said stator comprises a row of rectangular parallelopipedal packs of sheet-iron lamellae and nonmagnetic spacers securing said packs together to form a core, said packs projecting beyond said spacers to define grooves receiving said coil means.

3. A magnetic-suspension vehicle system, comprising a track; a pair of double-sided linear induction motors cooperating with said track, each of said motors comprising a movable central stator having a core and coil means on said core, said stator having a pair of opposite active faces extending along the direction of displacement thereof; and a stationary reaction member extending in the direction of movement of said stator, said member being composed of ferromagnetic material and being of U-profile with opposite parallel shanks of the U flanking said stator and each spacedly juxtaposed with a respective one of said active faces, said shanks each being provided with a reaction layer of material of high conductivity along its surface confronting the respective active face, said core and said coil means being constructed and arranged to produce a traveling magnetic field along said member for displacing said stator in said direction with a substantial part of the flux return path between magnetic flux entry into and return from said shanks being around the bight of the U, a horizontally open ferromagnetic rail forming the respective reaction member; a vehicle displaceable along said track in said direction and carrying the stators of said motors, each of said ferromagnetic rails being formed as an armature; and suspension and guide electromagnets mounted on said vehicle and spacedly juxtaposed with the respective armatures for supporting and guiding said vehicle along said track.

4. A magnetic-suspension vehicle system, comprising a track;
a horizontally open ferromagnetic rail forming the respective reaction member; a vehicle displaceable along said track in said direction and carrying the stators of said motors, each of said ferromagnetic rails being formed as an armature; and suspension and guide electromagnets mounted on said vehicle and spacedly juxtaposed with the respective armatures for supporting and guiding said vehicle along said track, each of said armatures being formed with a pair of transversely spaced poles projecting from a shank of the respective rail and formed unitarily therewith, said electromagnets being mounted on said vehicle in respective transversely spaced rows and having electromagnet cores cooperating with said poles of the respective armature.

5. The system defined in claim 4 wherein electromagnets of each row have their cores laterally offset to one side and the opposite side relative to said poles so as to generate magnetic fields with horizontal guidance components and vertical suspension components.

6. A double-sided linear induction motor, comprising a movable central stator having a core and coil means on said core, said stator having a pair of opposite active faces extending along the direction of displacement thereof; and a stationary reaction member extending in the direction of movement of said stator, said member being composed of ferromagnetic material and being of U-profile with opposite parallel shanks of the U flanking said stator and each spacedly juxtaposed with a respective one of said active faces, said shanks each being provided with a reaction layer of material of high conductivity along its surface confronting the respective active face, said core and said coil means being constructed and arranged to produce a traveling magnetic field along said member for displacing said stator in said direction with a substantial part of the flux return path between magnetic flux entry into and return from said shanks being around the bight of the U, said stator comprising a row of rectangular parallelopipedal packs of sheet-iron lamellae and nonmagnetic spacers securing said packs together to form a core, said packs projecting beyong said spacers to define grooves receiving said coil means, said member being horizontally open and said stator being wholly received between said shanks, said coil means including first and second coils surrounding the respective one of said packs with turns in planes parallel to the respective shanks and energized in phase to induce a magnetic flux primarily in a plane perpeniduclar to said member.

7. The double-sided linear induction motor defined in claim 6 wherein the lamellae of said packs lie in planes perpendicular to said direction and to said surfaces of said shanks.

* * * * *